United States Patent [19]

Hubbard

[11] Patent Number: 4,638,510
[45] Date of Patent: Jan. 27, 1987

[54] NECK PROTECTION DEVICE WITH OCCUPANT OF A HIGH PERFORMANCE VEHICLE

[76] Inventor: Robert P. Hubbard, 160 Kenberry, East Lansing, Mich. 48823

[21] Appl. No.: 802,986

[22] Filed: Nov. 29, 1985

[51] Int. Cl.[4] .................. A42B 3/02; A62B 35/00; B64D 25/06
[52] U.S. Cl. .................. 2/6; 244/122 AG; 280/290; 297/465
[58] Field of Search .............. 297/465; 244/122 B, 244/122 AG; 280/290; 2/6, 2, 425, 44, 45, 415, 416, 421

[56] References Cited

U.S. PATENT DOCUMENTS

| | | |
|---|---|---|
| 1,144,150 | 6/1915 | Marcovski . |
| 3,074,669 | 1/1963 | Bohlin . |
| 3,134,106 | 4/1964 | Shaffer et al. . |
| 3,278,230 | 11/1966 | Boyce et al. . |
| 3,329,464 | 7/1967 | Barwood et al. . |
| 3,499,681 | 3/1970 | Benitez, Jr. et al. . |
| 3,514,784 | 6/1970 | McDavid ........................... 2/2 |
| 3,671,974 | 6/1972 | Sims ................................ 2/425 X |
| 3,818,509 | 6/1974 | Romo et al. . |
| 3,873,996 | 4/1975 | Varteressian . |
| 3,878,561 | 4/1975 | Winiecki .......................... 2/2 |
| 3,900,896 | 8/1975 | Ackerman . |
| 3,925,822 | 12/1975 | Sawyer . |
| 4,063,778 | 12/1977 | Chika ............................... 297/465 |
| 4,219,193 | 8/1980 | Newman . |
| 4,319,362 | 3/1982 | Ettinger . |

FOREIGN PATENT DOCUMENTS 257623  3/1913  Fed. Rep. of Germany .......... 2/421

*Primary Examiner*—Werner H. Schroeder
*Assistant Examiner*—Andrew M. Falik
*Attorney, Agent, or Firm*—Ian C. McLeod

[57] ABSTRACT

A neck protection device (10) for a driver (10) or other occupant of a high performnace vehicle adapted to reduce motions or loading in the neck and upper torso is described. The device includes in combination a stiff yoke (12) with a high collar (11) extending up from the yoke and a set of tethers (15, 15a and 15b) for attachment to the lateral and rear portions of a helmet (16) and collar. The high collar extends upward to adjacent the center of gravity of the head and helmet which is at about eye level of the occupant. The tethers on the collar allow needed head movements and yet reduce the potential for fatigue and crash injury by carrying forces which would otherwise be transmitted through the neck and by reducing extreme motions of the neck.

15 Claims, 8 Drawing Figures

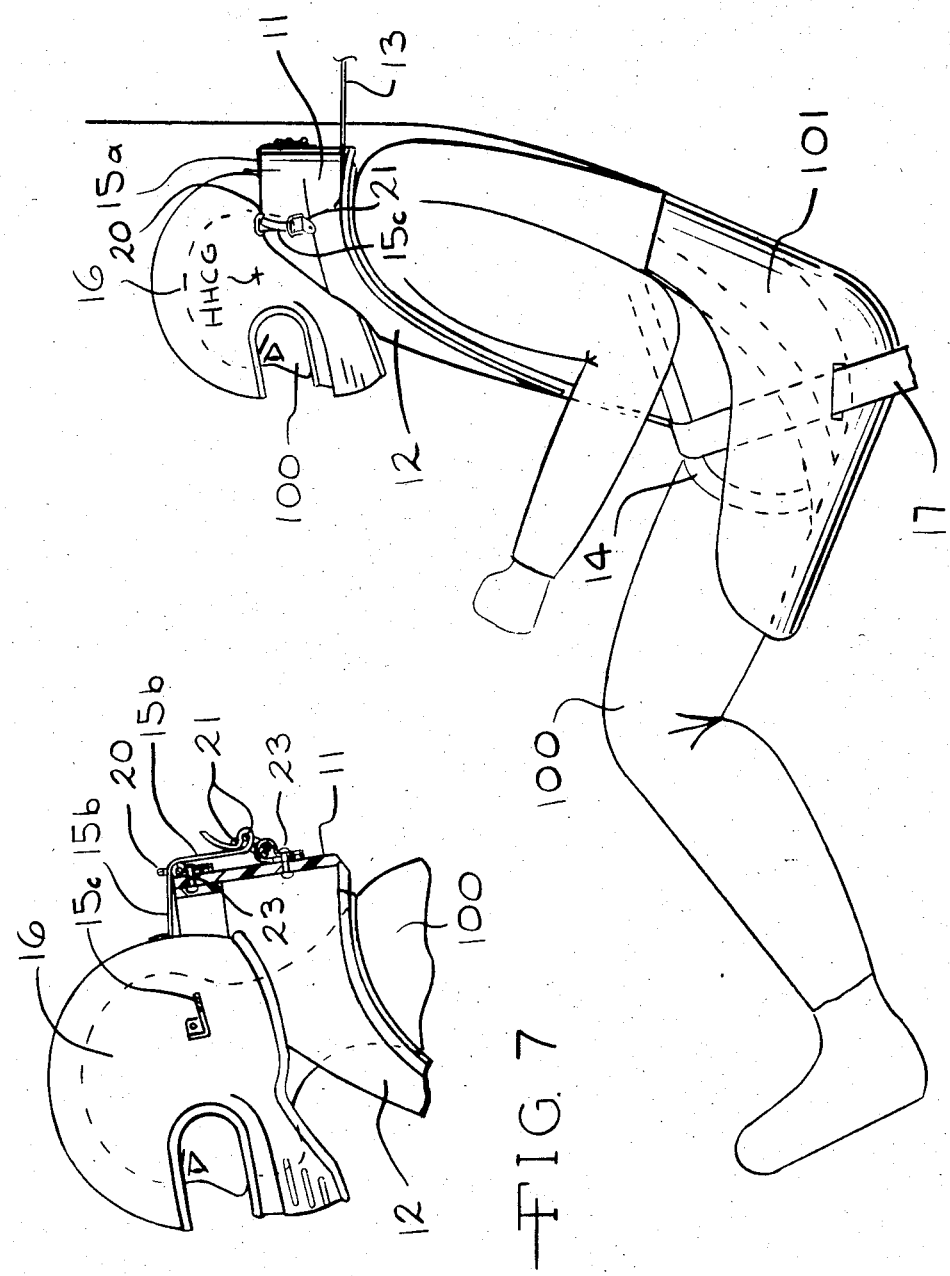

NECK PROTECTION DEVICE WITH OCCUPANT OF A HIGH PERFORMANCE VEHICLE

BACKGROUND OF THE INVENTION

(1) Summary of the Invention

The present invention relates to a neck protection device for use by drivers or other occupants of high performance vehicles including cars, boats and aircraft to reduce fatigue or injury. In particular, the present invention relates to a neck protection device which includes a yoke which fits over the shoulders and chest of the occupant under shoulder harnesses with a high collar on the yoke and with a set of tethers for attachment between the helmet and the collar.

(2) Prior Art

An occupant of a high performance car, plane, or boat commonly wears a helmet for protection from head injury and also wears a shoulder harness which restrains torso movements relative to the seat and vehicle. These vehicles are designed to be light and structurally stiff and to move and change directions rapidly. When the vehicle undergoes accelerations either in normal operation or in a crash, the torso of the occupant is restrained by the seat and harness to move with the vehicle but the helmeted head is commonly unrestrained except by contact with portions of the vehicle or seat. Thus, the loads which constrain the head to move with the torso are transmitted primarily through the neck. Such neck loads lead to fatigue during normal vehicle operation and to injury in a vehicle crash.

Various straps or neck brace structures have been used to transmit loads from the helmeted head to the torso. Such devices reduce neck muscle fatigue and some extreme motions of the neck. They also can contribute to compression, tension, shear, and bending of the neck and aggravate injury potential in a crash.

U.S. Pat. No. 3,278,230 to Boyce et al describes a shell and frame which is individually fitted and worn on the torso of an astronaut or crew of a high performance aircraft. This shell and frame serve as the seat back once it is secured into the aircraft by means of pins. A head rest is mounted to the frame extending upward from the torso shell to behind the head. The head is securely held in the headrest by one strap on either side of the helmet only when these straps are retracted once the restraint system is actuated in an emergency situation. There is no specific description given of the placement of the straps relative to the geometric configuration of the head and helmet. Except for rearward movements of the helmet which are restrained by contact with the headrest, the head and helmet are not restrained under normal vehicle operation but only by retraction of the straps on the reels which must be actuated for system operation.

U.S. Pat. No. 3,900,896 to Ackerman describes a bar which attaches to the rear of a football helmet and extends downward to fit into a cylindrical guide attached to the shoulder pads. This device would allow only movements of the helmet relative to the shoulder pads which are vertical along the axis of the bar and rotational about the axis of the bar; other motions are restrained by the device. The restrained motions are needed for athletic performance or vehicle operation and the motions not restrained by the device could result in potentially fatiguing or injurious loading in the neck.

U.S. Pat. No. 3,873,996 to Varteressian describes a device (similar to that described in U.S. Pat. No. 3,900,896 to Ackerman above) which includes a bar with its upper end attached to the rear of the helmet in a track to allow vertical motion of the bar relative to the helmet within limits of the track and the lower end of the bar attached by a ball and socket to a jacket worn on the torso. Movements of the neck are restrained by the ball-and-socket at the jacket and the slider in the track at the helmet; these restrained neck motions are not those that would naturally occur and they could be irritating to the user. For example, lateral bending of the neck to the right or left must follow the combination of rotations and translations dictated by the center of ball-and-socket joint rather than the motions of the vertebral linkage. If the stops in the ball-and-socket and slider are configured correctly, this design could reduce the potential for injury at the extremes of neck motion.

U.S. Pat. No. 3,925,822 to Sawyer describes a harness with straps on the torso and connected to the helmet to prevent the helmet from leaving the head. The harness straps do not substantially restrain the forward bending of the neck and they could cause potentially injurious compressive and bending loading in the neck under extreme neck motions.

U.S. Pat. No. 3,818,509 to Romo et al describes a strap between a football helmet and shoulder pads which is similar in effect to the harness described in U.S. Pat. No. 3,925,822 to Sawyer above.

U.S. Pat. No. 3,499,681 to Benitez et al describes a device as such: "Columnar support extends upward from the back of the occupant for attachment to the crash helmet." This support is not substantively described.

U.S. Pat. No. 3,134,106 to Shaffer et al describes an attachment of a football player's helmet to the shoulder pads by pin joints on either side of the neck.

Other U.S. patents more distantly related to the present invention include U.S. Pat. No. 1,144,150 to Marcousky; U.S. Pat. No. 3,074,669 to Bohlin; U.S. Pat. No. 3,099,261 to Doss et al; U.S. Pat. No. 3,148,375 to Jones; U.S. Pat. No. 3,329,464 to Barwood et al; U.S. Pat. No. 4,219,193 to Newman; and U.S. Pat. No. 4,319,362 to Ettinger.

Thus, the prior art does contain descriptions of related devices with some of the elements of the present invention including straps to restrain helmet motions and supports between helmet and torso. These prior devices are intended to protect the neck from injury; however they do not address the problem of relative movement of the head in relation to the body in a crash situation.

OBJECTS

It is an object of the present invention to provide a neck protection device which restrains the helmet and head adjacent their center of gravity to protect the occupant's neck from the various forces and motions that are applied while in a high performance vehicle, which would otherwise result in fatigue or injury. Further it is an object of the present invention to provide a device which distributes restraining loads to the upper torso thereby reducing the potential for fatigue and injury. These and other objects will become increasingly apparent by reference to the following description and the drawings.

IN THE DRAWINGS

FIG. 1 is a side view of the neck protection device (10) of the present invention, particularly illustrating a helmet, a partial set of tethers (15, 15b) and a high collar on a stiff yoke (12) and also illustrating the position of a driver's body and upper torso restraint harnesses (13) while wearing the neck protection device wherein the tethers are attached to the collar (11), adjacent the head and helmet center of gravity (HHCG).

FIGS. 6 and 7 show the helmet (16) and head with the rear tether (15b) extended when a crash occurs in the front of the vehicle.

FIG. 8 shows an alternative embodiment of the neck protection device (10a) wherein dual tethers (15d, 15e) are attached at the rear portion of the helmet (16) in addition to the other tethers adjacent the HHCG.

GENERAL DESCRIPTION

Figure 1:
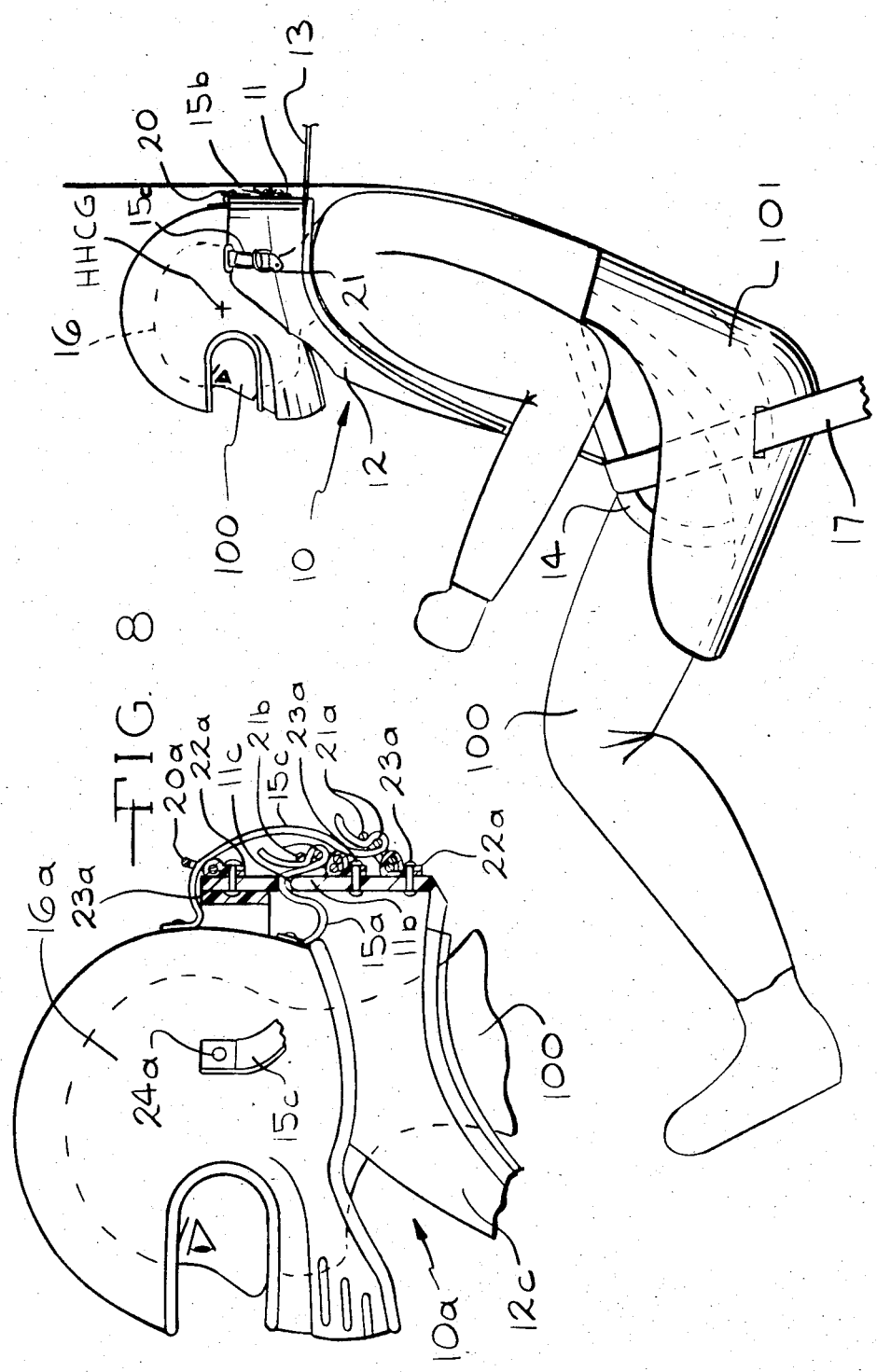

The present invention relates to a neck protection device for a shoulder and lap belted driver or other occupant of a high performance vehicle having forward and lateral fields of view with a helmet on the head of the occupant and with a horizontal level center of gravity of the head and helmet combined at about eye level of the occupant which comprises: a stiff restraining means or yoke, having lateral, front and rear portions relative to the occupant, which is contoured to fit the rib cage and shoulders and around the neck of the occupant; a stiff high collar mounted on the restraining means including lateral, front and rear portions relative to the occupant which extends upward to adjacent the center of gravity of the head and helmet and adjacent the neck of the occupant around the lateral and rear portions of the restraining means and which is open at the front portion of the restraining means and allows movement of the helmeted head to provide the forward and lateral fields of view; and first fastening means mounted around the collar adjacent the center of gravity of the helmeted head for attaching a plurality of tethers between the lateral and rear portions of the collar and the helmet, wherein in normal vehicle operation or a crash the collar transmits forces to the restraining means from the tethers thereby reducing the forces from being transmitted through the neck which cause fatigue and injury in vehicle operation or in a crash.

The present invention also relates to a helmet for use by an occupant of a high performance vehicle with a neck protection device having a high collar mounted on a restraining means which is contoured to fit the rib cage and shoulders and around the neck of the occupant which comprises: a crash helmet having an outer casing for protecting the head of the occupant of the vehicle having a horizontal level center of gravity of the head and helmet combined at about eye level; and multiple tethers attached to opposite lateral and rear portions of the casing adjacent the center of gravity and having a length for attachment to the high collar of the neck protection device.

The present invention finally relates to a method for providing neck protection of an occupant of a high performance vehicle while wearing a helmet which comprises: providing a stiff restraining means including lateral, front and rear portions relative to the occupant which is contoured to fit the rib cage and shoulders and around the neck of the driver; a stiff high collar mounted on the restraining means, having lateral, front and rear portions relative to the occupant, which extends upward to adjacent a horizontal center of gravity of the head and helmet combined at about eye level of the occupant and adjacent the neck of the occupant around the lateral and rear portions of the restraining means and which is open at the front portion of the restraining means and allows movement of the helmeted head to provide the forward and lateral fields of view; and first fastening means mounted around the collar adjacent the center of gravity of the helmeted head for attaching a plurality of tethers between the lateral and rear portions of the collar and second fastening means on the helmet; providing a helmet with lateral, front and rear portions relative to the occupant on the head of the occupant with second fastening means holding tethers on the lateral and rear portions of the helmet; and connecting the tethers between the collar and the helmet so as to allow movement of the helmet and head relative to the collar, wherein in normal vehicle operation or in a crash the collar transmits forces from the tethers to the restraining means thereby reducing the forces from being transmitted through the neck which cause fatigue and injury in vehicle operation or in a crash.

In the device of the present invention the high collar extends upward from the restraining means or yoke to adjacent the center of gravity of the head and helmet combined. The high collar transmits crash forces to the torso through the restraining means or yoke from the helmet and tethers reducing the forces transmitted through the neck of the driver. The yoke is worn on the front and upper part of the torso preferably with shoulder harnesses over and restraining it, although the yoke could be attached by other means to the torso of the person or the seat of the vehicle. The collar portion is preferably integral with the yoke portion and extends upward on the sides and rear to about the level of the center of gravity of the head and helmet combined. The tethers attach the helmet to the collar and allow needed head movements and restrain the head relative to the torso so that forces in normal vehicle operation or in a crash are carried to the torso through the tethers, collar, and yoke rather than through the neck. Thus, the device reduces the loading of the neck and the potential for neck fatigue and injury.

SPECIFIC DESCRIPTION

Figure 2:
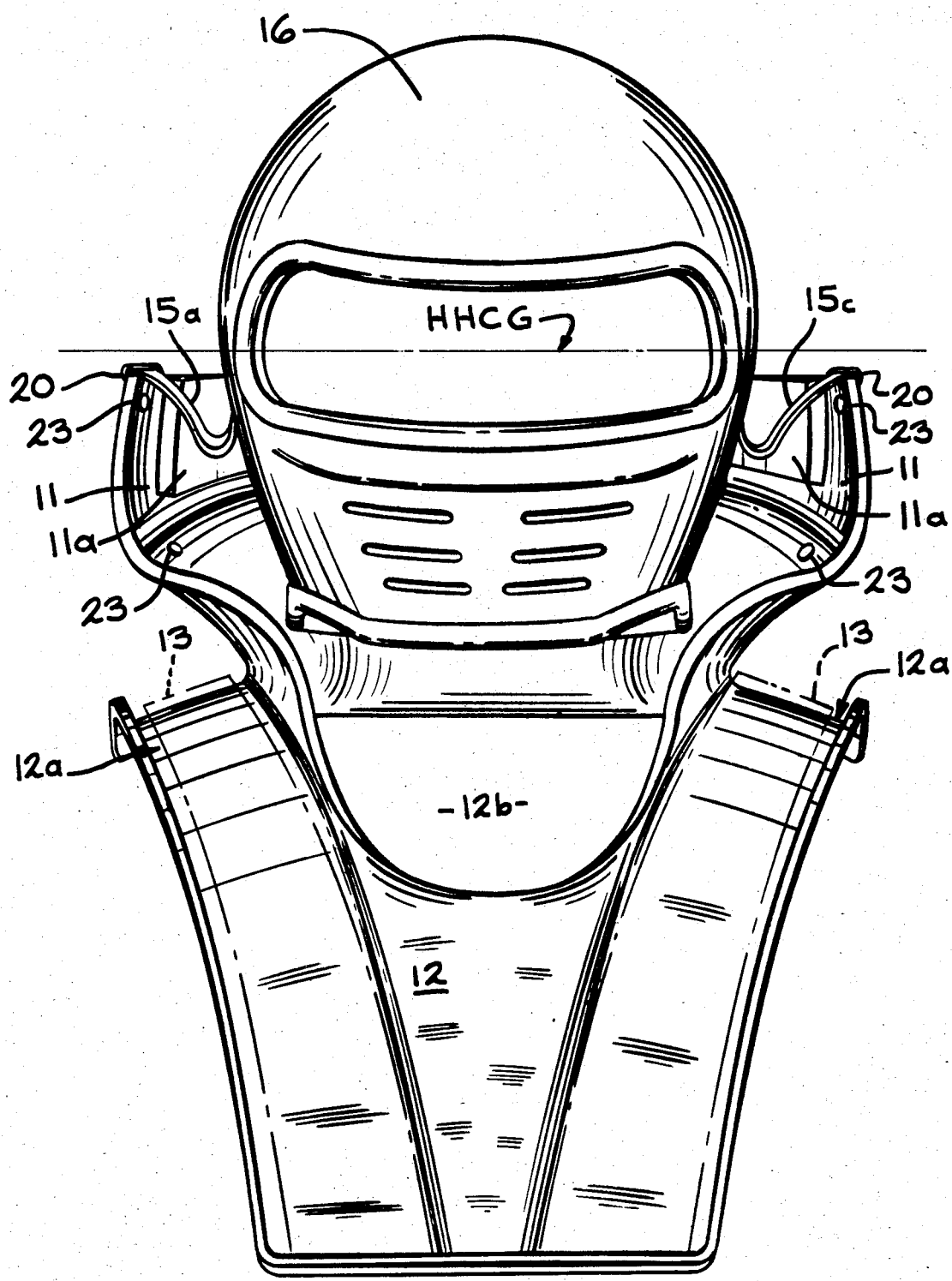
FIG. 2 is a front view of the neck protection device shown in FIG. 1, particularly illustrating the lateral attachment of tethers (15, 15a) to the helmet (16) and high collar (11).
Figure 3:
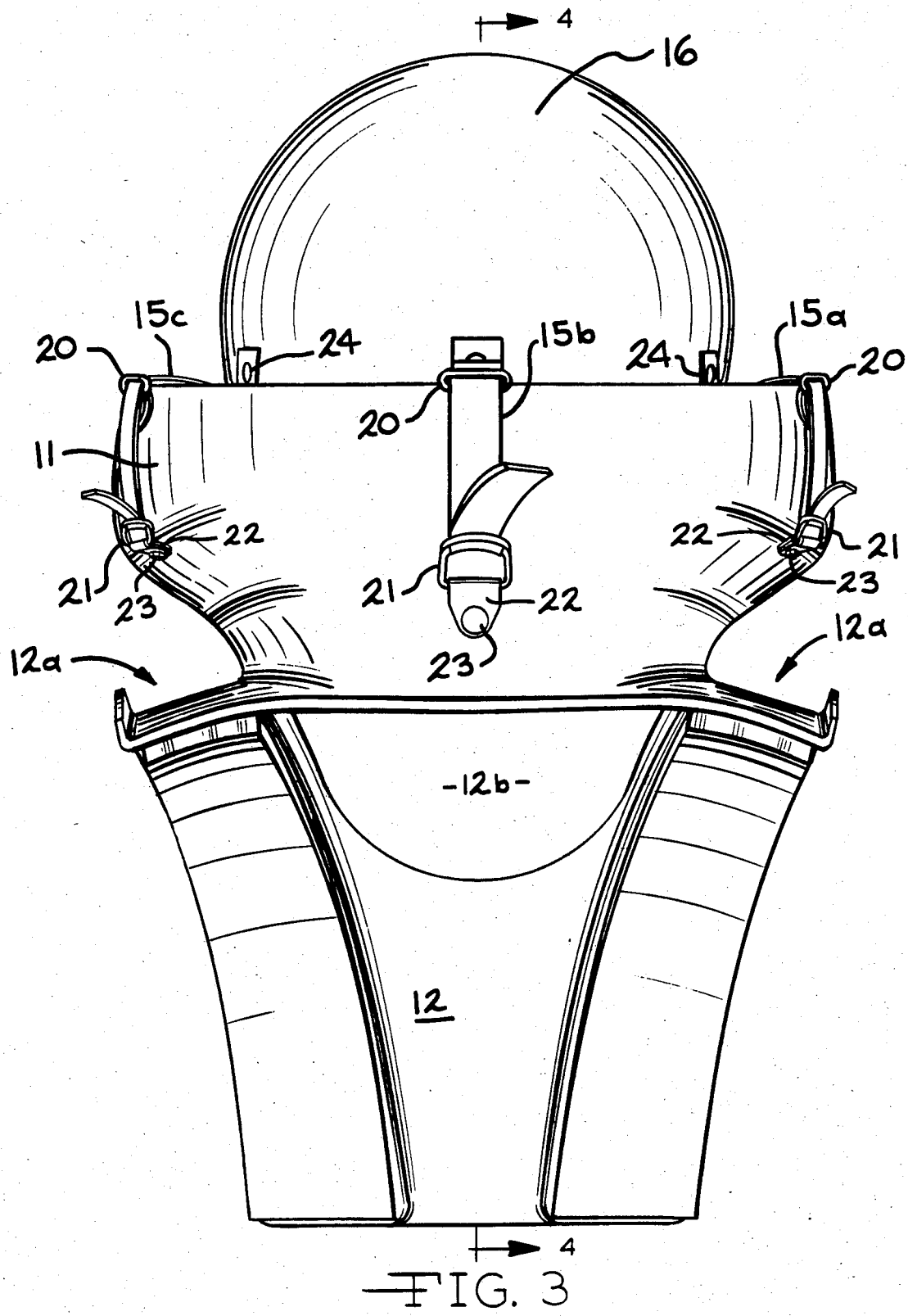
FIG. 3 is a back view of the neck protection device (10) shown in FIG. 1, particularly illustrating the attachment of the tethers (15, 15a, 15b) to the rear and lateral portions of the high collar (11) and further illustrating the attachment of the tethers to the helmet (16).
Figure 4:
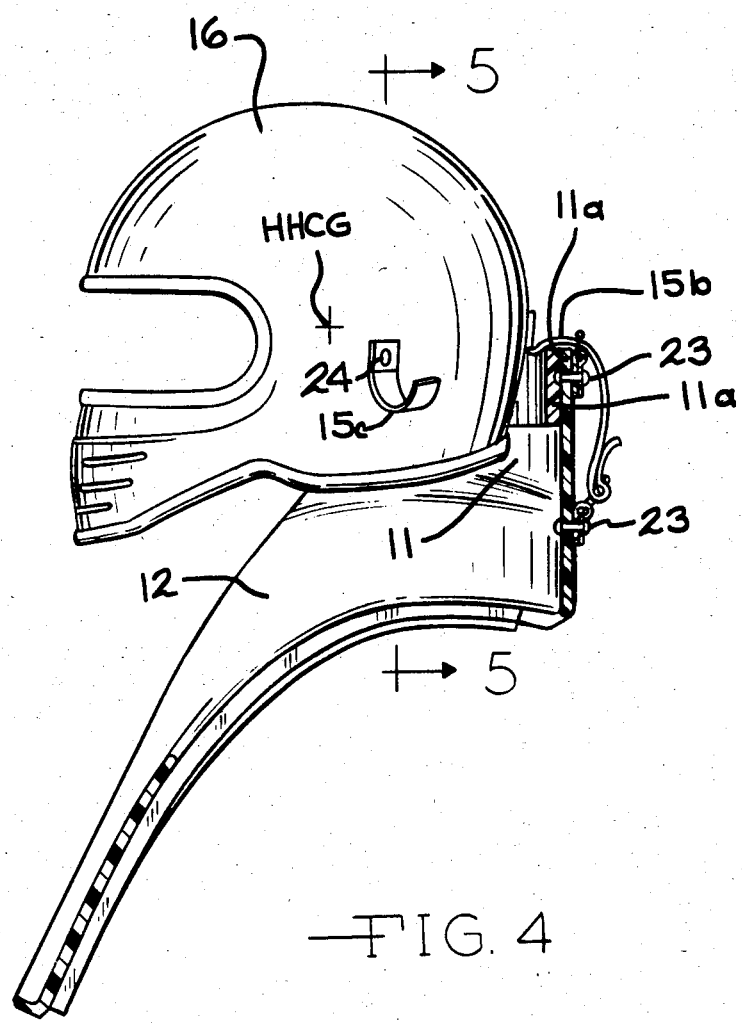
FIG. 4 is a side partial cross-sectional view of the neck protection device (10) along line 4—4 of FIG. 3, particularly illustrating the configuration of the collar (11) at the front to allow needed head movement.
Figure 5:
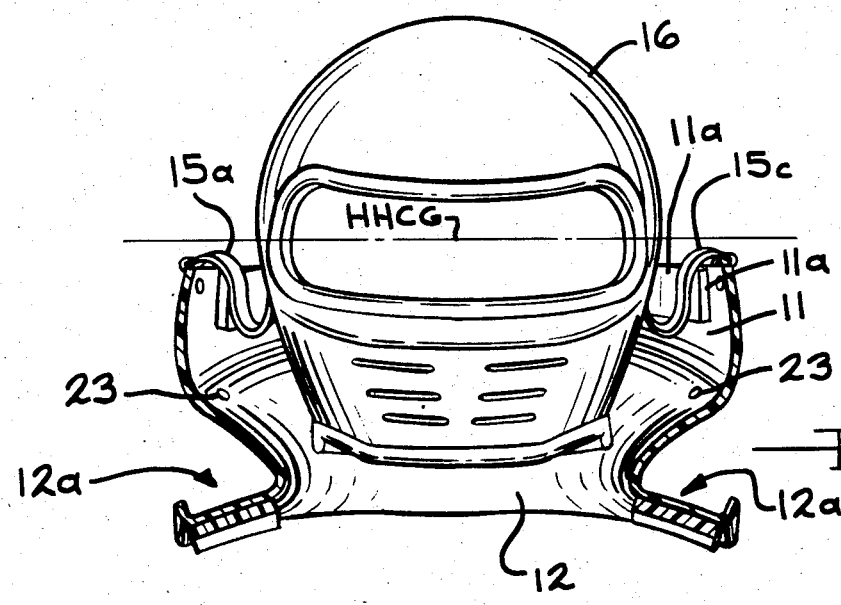
FIG. 5 is a front partial sectional view of the neck protection device (10) along line 5—5 of FIG. 4, further illustrating the position of the lateral tethers (15, 15a).

Referring to FIG. 1, a neck protection device 10 is shown mounted on driver 100 or other occupant of a vehicle. The neck protection device 10 has a high collar 11 which is integral with a yoke 12. The yoke 12 is contoured and preferably padded to fit the rib cage and shoulders of the occupant 100. A pair of occupant restraints or shoulder harness straps 13 are positioned in grooves or slots 12a on either side of and over the yoke 12 to hold the yoke 12 against the torso of the driver 100. The high collar 11 has a plurality of tethers 15, 15a and 15b (FIG. 2) attached to helmet 16 and mounted through first guides 20 on the upper edge of the high collar 11 and attached to a second fastening means, such as on dual D-rings 21, on the lower portion of the collar 11. Conventional crotch and lap belts 14 and 17 are provided with the shoulder harnesses 13 to secure the driver 100 to a seat 101. The high collar 11 includes a pad 11a to prevent abrasion by the helmet 16.

The tethers 15, 15a and 15b are made of a relatively stiff material such as nylon or leather. The yoke 12 and collar 11 are made of a high impact resistant plastic material. Preferably the yoke 12 and collar 11 are molded as a complete unit.

The guides 20 and D-rings 21 are held in place by clips 22 and rivets 23 or other attachment means. Rivets 24 or similar attachment means secure the tethers 15, 15a and 15b to the helmet 16.

As shown in FIG. 6, the high collar 11 transmits forces to the torso from the tethers 15, 15a and 15b attached to the high collar 11 and helmet 16, otherwise such forces would be transmitted through the neck. The function of the high collar 11 and tethers 15, 15a and 15b is to provide a structure to transmit forces to the helmet 16 and head which restrain the movement of the head relative to the torso. These restraining forces are in a nearly horizontal plane at or adjacent the level of the center of gravity of the head and helmet 16 (HHCG). The tethers 15, 15a and 15b have an appropriate length to permit mobility of the head, yet prevent fatiguing and potentially injurious head motions.

The device of the present invention provides a path for forces between the head and torso which is outside of the neck thus restraining motions of the head relative to the torso and reducing neck loading, fatigue, and potential for injury. Also, the device provides distribution of and protection from restraining forces applied to the upper torso by conventional shoulder harnesses 13.

The yoke 12 is worn between the driver's clothing and the restraining shoulder harness 13. Thus, the neck protection device does not require considerable change from current torso restraint practice, only proper placement of harness 13 anchors on the vehicle (not shown). The yoke 12 provides a surface which is contoured and padded to fit to the front of the rib cage and the top of the shoulders, and the yoke 12 distributes the loads of the shoulder harnesses 13 on the torso over a surface which is larger than the harnesses 13 alone, especially where the belts curl as they load on the torso without the yoke 12. The yoke 12 also serves as the base for the collar 11 and transmits the forces to the torso and shoulder harness 13 restraint system from the collar 11 which restrains the head of the occupant 100.

The configuration of the yoke 12 is important to the fit of the invention for a variety of occupants. The head must fit through the opening 12b in the yoke 12. The shoulders and inner surfaces of the upper arms must be accommodated without uncomfortable contact with the side of the yoke 12 while the shoulder belts, commonly 3 in. (76 mm.), pass over the front of the chest and top of the shoulders.

The collar 11 provides the attachment for the tethers 15, 15a and 15b near the HHCG level. The collar 11 transmits forces to the torso from the tethers 15, 15a and 15b or from direct contact of the collar 11 with the helmet 16. Such forces would otherwise be transmitted through the neck. The collar 11 surrounds the rear and lateral parts of the helmet 16 and neck up to near the level of the HHCG. Sufficient clearance between collar and helmet 16 is provided to allow movement of the head needed for operation of the vehicle.

The length of the tethers 15, 15a and 15b is sufficient to permit mobility of the head for ingress, egress, and operation of the vehicle. The tethers 15, 15a and 15b lengths are adjusted to limit motions of the head relative to the torso and to substantially reduce the loading of the neck thus reducing fatigue and potential for injury. While the wearer is in the vehicle with the restraint harness secured over the yoke 12 and torso, the movements of the yoke 12 relative to the torso are limited. With the shoulder harnesses 13 released on entry and exit of the vehicle, the device 10 can move more freely relative to the body and allow easier body movement with the device in place.

FIG. 8 shows an alternative embodiment of neck protection device where the helmet 16a is positioned over a yoke 12c with collar 11b an integral part of the yoke 12c. The lateral tethers 15a (one shown) are secured to the helmet 16a by rivets 24a. A rear tether 15c is connected to the helmet 16a as shown in FIG. 1 with guide 20a and D-rings 21a. In this embodiment, a second tether 15d is provided through a slot 11c in the collar 11b and secured to the collar 11b by a second set of D-rings 21b. Rivets 23a secure clips 22a which hold the guides 20a and D-rings 21a in place.

OPERATION

As shown in FIGS. 6 and 7 with rearward acceleration (such as in applying the brakes or striking something with the front of the vehicle), the body tends to move forward relative to the vehicle and the torso is restrained by rearward force from the harness 13 and the yoke 12. The head tends to continue moving forward but is restrained to move with the torso by the tethers 15, 15a and 15b. The tether 15, 15a and 15b forces restraining the head relieve the neck of head and helmet 16 restraint. Thus, these tether 15, 15a and 15b forces reduce the fatiguing demands on the neck structure and the potential for injury from the loads that would be present without the device 10, and they protect the wearer from extreme neck motion relative to the torso. The loads from the tethers 15, 15a and 15b are transmitted through the collar 11 and yoke 12 to the torso and belts 13 of the shoulder harness 13. In rearward vehicle acceleration with forward head motion relative to the torso, the yoke 12 will tend to move forward relative to the vehicle and rotate with the top of the collar 11 moving forward relative to the bottom due to the head/helmet 16 restraining forces. The tendency for the yoke 12 to move forward will be restrained by the harness shoulder belts 13 in much the same way as normally occurs without the device 10 present. The tendency for the top of the device 10 to rotate forward will be restrained by the shoulder harnesses 13 acting downward on the predominately horizontal surface of the yoke 12 portion on top of and to the rear of the shoulders. This constraint of rotation will also reduce the tendency of the front, lower part of the yoke 12 to load the lower part of the rib cage. Thus, as the wearer of the device 10 is accelerated rearward, the head, torso, yoke 12, and associated apparel move forward relative to the vehicle, the torso and yoke 12 are restrained by the shoulder harnesses 13 and the head and helmet 16 are restrained to move with the torso by the device 10. The forces to restrain the head and helmet 16 will be predominately carried through the device 10 to the shoulder belts 13.

In sideways acceleration (such as in striking an object with the side of the vehicle), assume, for the sake of illustration, that the vehicle is accelerated to the left as would occur in turning toward the left or striking an object with right side of the vehicle and that forces and motions are expressed relative to the vehicle. The torso is restrained by the seat 101 and harness 13. The helmet 16 and head are restrained to accelerate to the left with the torso by tension in the tethers 15, 15a and 15b on the left side and by contact with the collar 11 on the right side. The tethers 15, 15a and 15b are configured so that with sidewards motion the helmeted head also moves rearward into the collar 11. In sidewards acceleration, the loads on the collar 11 from the helmeted head tend to rotate the top of the yoke away from the direction of the acceleration (top toward the right in the current example). The yoke 12 tends to move downward onto the right shoulder and upward off of the left shoulder. This tendency to rotate is resisted by the forces between the yoke 12 and the right shoulder and by force between the yoke 12 and the shoulder harness 13 on the left side. The head, helmet 16, and device 10 also tend to move to the right, and this motion is resisted by the shoulder harnesses 13 on the right and, to some extent, by the belt 13 on the left bearing against the belt retaining grooves 12a of the yoke 12 and the contact between the collar 11 and the upper shoulders and neck.

Forward acceleration (as in striking something with the rear of the vehicle) will cause the body to move rearward. The torso loads are resisted by the seat 101. The head loads are resisted by helmet 16 contact with the collar 11 which comes into contact with the vehicle surface or seat 101 close behind the normal position of the head. Thus, the restraint of the body in forward acceleration is essentially the same as would occur without the device 10.

Thus the head, helmet, neck and torso accelerations with components in forward, rearward, or sideward directions are restrained as combinations of the mechanical responses described above.

The yoke 12 and collar 11 are constructed so that there is unobstructed lateral and forward fields of view for the driver and other occupants. The forward direction is regarded as the direction the vehicle is traveling. The directions "front", "rear" and "lateral" are all relative to the occupant of the vehicle.

It is intended that the foregoing description be only illustrative of the present invention and that the present invention be limited only by the hereinafter appended claims.

I claim:

1. A neck protection device for a shoulder and lap belted driver or other occupant of a high performance vehicle having forward and lateral fields of view with a helmet on the head of the occupant and with horizontal level center of gravity of the head and helmet combined at about eye level of the occupant which comprises:
    (a) a stiff restraining means including lateral, front and rear portions relative to the occupant which is contoured to fit the rib cage and shoulders and around the neck of the occupant;
    (b) a stiff high collar mounted on the restraining means, having lateral, front and rear portions relative to the occupant, which extends upward to adjacent the center of gravity of the head and helmet combined and adjacent the neck of the occupant around the lateral and rear portions of the restraining means and which is open at the front portion of the restraining means and allows movement of the helmeted head to provide the forward and lateral fields of view; and
    (c) first fastening means mounted around the collar adjacent the center of gravity of the helmeted head for attaching a plurality of tethers between the lateral and rear portions of the collar and the helmet, wherein the tethers provide a restraint which is in a substantially horizontal plane between the helmet and the collar and wherein in normal vehicle operation or in a crash the collar transmits forces to the restraining means from the tethers thereby reducing the forces being transmitted through the neck which cause fatigue and injury in vehicle operation or in a crash.

2. The neck protection device of claim 1 wherein the high collar is integral with the rigid restraining means.

3. The neck protection device of claim 1 wherein the high collar is flared outward from the restraining means to facilitate limited movement of the head and helmet.

4. The neck protection device of claim 1 wherein the restraining means and high collar are integral and constructed of a highly impact resistant plastic material.

5. The neck protection device of claim 1 in combination with the helmet wherein the tethers are adjustably attached to the high collar with the first fastening means and are attached to the helmet by a second fastening means.

6. The neck protection device of claim 5 wherein the tethers are riveted to the helmet.

7. The neck protection device of claim 1 wherein the restraining means has grooves which accommodate a shoulder harness.

8. The neck protection device of claim 1 wherein the first fastening means are provided in part on an upper edge of the lateral and rear portions of the collar.

9. The neck protection device of claim 8 wherein there are between three and four tethers, one on each of the lateral portions and between one and two on the rear portions of the collar.

10. A method for providing neck protection of an occupant of a high performance vehicle wearing a helmet which comprises:
    (a) providing a stiff restraining means, having lateral, front and rear portions relative to the occupant, which is contoured to fit the rib cage and shoulders and around the neck of the driver; a stiff high collar mounted on the restraining means including lateral, front and rear portions relative to the occupant which extends upward to adjacent a horizontal center of gravity of the head and helmet combined at about eye level of the occupant and adjacent the neck of the occupant around the lateral and rear portions of the restraining means and which is open at the front portion of the restraining means and allows movement of the helmeted head to provide the forward and lateral fields of view; and first fastening means mounted around the collar adjacent the center of gravity of the helmet and head for attaching a plurality of tethers between the lateral and rear portions of the collar and second fastening means on the helmet wherein the tethers provide a restraint which is in a substantially horizontal plane between the helmet and the collar;

(b) providing a helmet with lateral, front and rear portions relative to the occupant on the head of the occupant with second fastening means holding tethers on the lateral and rear portions of the helmet; and (c) connecting the tethers between the the collar and the helmet so as to allow movement of the helmet and head relative to the collar, wherein in normal vehicle operation or in a crash the collar transmits forces from the tethers to the restraining means thereby reducing the forces from being transmitted through the neck which cause fatigue and injury in vehicle operation or in a crash.

11. The method of claim 10 wherein there are two lateral tethers and between one and two rear tethers which are connected between the helmet and collar.

12. A helmet for use by an occupant of a high performance vehicle wearing a stiff restraining means which is contoured to fit the rib cage and shoulders and around the neck of the occupant with a neck protection device having a high collar mounted on the restraining means wherein the helmet, restraining means and high collar provide a neck protection device which comprises:

(a) a helmet having an outer casing for protecting the head of the occupant of the vehicle having a horizontal level center of gravity of the head and helmet combined at about eye level; and (b) multiple tethers attached to opposite lateral and rear portions of the casing adjacent the center of gravity and having a length for attachment to the high collar of the neck protection device, wherein the tethers are positioned in a substantially horizontal plane between the helmet and the collar.

13. The helmet of claim 12 wherein the tethers are riveted to the helmet.

14. The helmet of claim 12 wherein there are between three and four tethers, one on each of the opposite lateral portions of the helmet and between one and two on the rear portions of the helmet.

15. The helmet of claim 12 in combination with the neck protection device.

* * * * *